United States Patent
Cheng (10) Patent No.: US 7,489,732 B2
(45) Date of Patent: Feb. 10, 2009

(54) DECREASING COMPUTATIONAL COMPLEXITY OF TD-SCDMA MEASUREMENT PROCESS

(76) Inventor: Jian Cheng, 2-402, 1178 ShangCheng Road, Pudong, Shanghai 200120 (CN)

(*) Notice: Subject to any disclaimer, the term of this patent is extended or adjusted under 35 U.S.C. 154(b) by 669 days.

(21) Appl. No.: 10/974,096

(22) Filed: Oct. 26, 2004

(65) Prior Publication Data
US 2006/0098600 A1    May 11, 2006

(51) Int. Cl.
*H04K 1/10* (2006.01)
*H04L 27/28* (2006.01)

(52) U.S. Cl. .............. 375/260; 455/522; 370/335; 370/342

(58) Field of Classification Search ......... 375/259–260, 375/316, 340; 370/335, 342; 455/522
See application file for complete search history.

(56) References Cited

U.S. PATENT DOCUMENTS

| 6,816,470 | B2* | 11/2004 | Kim et al. ............ 370/280 |
| 6,826,411 | B2* | 11/2004 | Dick et al. ........... 455/522 |
| 6,993,002 | B2* | 1/2006 | Pan et al. ............ 370/335 |
| 2002/0003782 | A1* | 1/2002 | Pan et al. ............ 370/280 |
| 2002/0031105 | A1* | 3/2002 | Zeira et al. .......... 370/337 |
| 2003/0086380 | A1* | 5/2003 | Kim et al. ............ 370/280 |
| 2003/0086394 | A1* | 5/2003 | Zeira et al. .......... 370/331 |
| 2006/0109806 | A1* | 5/2006 | Kwak et al. .......... 370/310 |

* cited by examiner

*Primary Examiner*—Jean B Corrielus (57) ABSTRACT

The embodiments of the present invention relate to the general area of wireless communication systems and, in particular, to fast and efficient measurement techniques for TD-SCDMA technology. The measurement subsystem is one of the main subsystems of a TD-SCDMA system and comprises measurement of several radio network quantities, each of which is required by a number of system procedures. The measurement of some quantities is computationally more complex than that of the others, such as the measurement of ISCP (Interference Signal Code Power) and IRT (Impulse Response Timing). The proposed method of this invention decreases the computation complexity of the ISCP measurement.

19 Claims, 7 Drawing Sheets

DECREASING COMPUTATIONAL COMPLEXITY OF TD-SCDMA MEASUREMENT PROCESS

The concepts of this invention relate generally to wireless digital communication systems and, in particular, to fast and efficient measurement techniques for code-division multiple access technology.

BACKGROUND

More and more, the cellular service providers are focusing on techniques for high-capacity and efficient communication of digital information over wireless links. In 1998 the Chinese Wireless Telecommunications Standards proposed to the International Communications Union a new standard that is based on Time Division Duplexing (TDD) and Synchronous Code-Division Multiple Access (CDMA) technology (TD-SCDMA) for TDD. The International Communications Union has approved and adopted this proposal. The TDD uses a single frequency band for uplink as well as downlink, but at different predetermined time slots. The CDMA is based on Direct-Sequence Spread-Spectrum (DS-SS) principles, where multiple users simultaneously occupy the same radio frequency channel, separated only by user-specific spreading or signature sequences.

DS-SS communication requires detection of one or more spreading chip-code sequences embedded in an incoming spread-spectrum signal as well as subsequent synchronization of the receiver with the detected chip-code sequence. Also, prior to transmission, predetermined symbols (e.g., midambles) are inserted in each frame to detect and compensate for the distortion of the information symbols by comparing their distortion to the distortion of the predetermined symbols. In other words a transmitter inserts what are called training symbols in each frame, and a receiver, which already expects these training symbols, extracts the distorted symbols from the received frames and uses their distortion information for channel estimation. As a result, in TD-SCDMA systems, time slots and spreading codes separate the users in a cell.

In a CDMA environment, as well as other types of communication settings employing DS-SS, two or more transmitters may transmit at the same time using different spreading codes. The individual channels interfere with one another, since the characteristics of the spreading codes that are used are not ideal. In such a situation, particularly if the receiver must receive the transmissions simultaneously, the receiver must search for and acquire multiple codes at the same time from within a broad-spectrum wireless signal.

In a CDMA system, the multiple access interference (MAI) affects all users equally. While detection schemes such as the rake receiver are sub-optimal because they only consider the user's signal information without any attempt to characterize the interference from other users, the Joint Detection algorithms process all users in parallel and include the interference information from all. Joint detection and its associated parallel processing are well suited for TD-SCDMA systems because in every time slot the users are synchronized and are limited to a very manageable number. The result is a joint detector of reasonable complexity that can easily be implemented in today's parallel computational architectures.

In addition to the MAI problem, because the signal transmitted by a wireless terminal to a base station is radiated omnidirectionally from the wireless terminal, some of the transmitted signal may reach the base station in a direct, line-of-sight path, while most of the transmitted signal radiates in other directions and never reaches the base station. Hence, some of the signals that radiate initially in a direction other than toward the base station strike an object, such as a building, and are reflected toward the base station. Therefore, a signal can radiate from the wireless terminal and be received by the base station via multiple signal paths. Such a signal and its reflections arrive at the base station at different times and will interfere to form a composite of several constituent signals. This is known as "multipath" interference. Furthermore, the characteristics of each received signal are affected by the length of the path traveled and the objects from which the signal has been reflected.

Furthermore, for a CDMA system to operate at all and to allow the available frequency range to be used optimally, it is of major importance to have the same interference power magnitude, at the receiver, on each individual channel. Otherwise, it is possible for a channel with a comparatively high interference power to conceal the other channels, and to make their detection impossible. For this reason, every CDMA system uses power control. In general, power control in a CDMA system plays a major role, with a critical influence on the overall performance of the system.

The power control per se is specified by the respective standard. For a CDMA system, the power control is based on measuring the SINR, which is the ratio of the useful power to the interference power in a detected channel. The receiver then transmits this measured value in the form of a transmission power control command (TCP) back to the transmitter on the back channel. The transmitter then individually adapts the transmission power for each channel, in order to achieve a standard SINR for all the channels in the receiver. One advantageous side effect in this case is that this power control can compensate within certain limits for fluctuations in the physical mobile radio channel (slow fading), thus allowing the transmission capacity to be increased.

The measurement of the useful power is relatively simple; however, it is considerably more difficult to measure the interference power, although this has a significant influence on the measurement accuracy of the SINR, since this factor is located in the denominator of the useful power to interference power ratio. The UMTS (Universal Mobile Telecommunication System) Standard states that the interference power should be determined from the pilot symbols, which are known apriori to the receiver, after the despreading of the received signal.

Almost every stage of the many stages of the transmission and the reception of a signal, such as spreading, despreading, filtering, and Joint Detection, requires numerous computations. These computations, in addition to the received signal, utilize various radio-related quantities, where measurement of each quantity necessitates further computations. Simplification of any required computation will directly affect a radio network's speed and efficiency and, as a result, its capacity.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
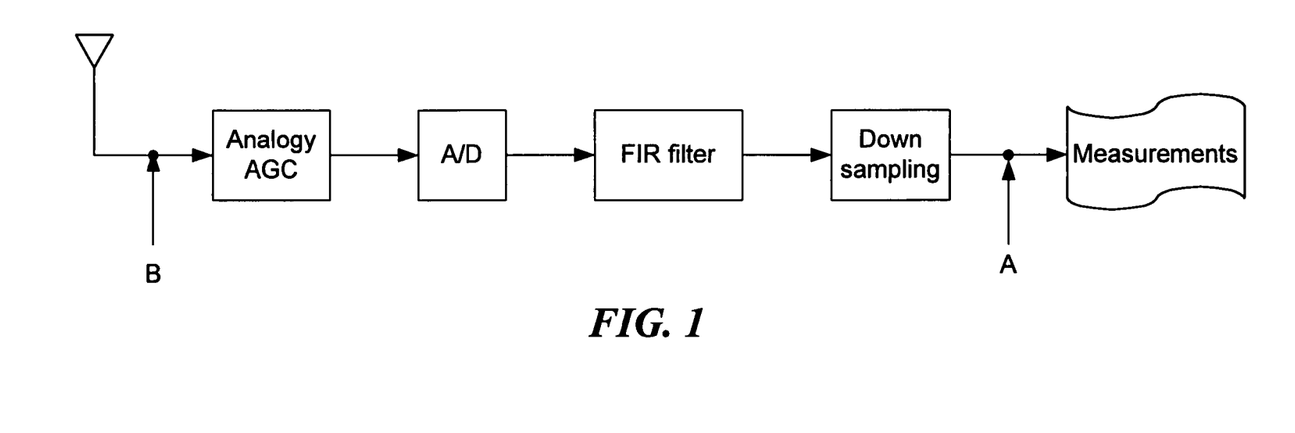
FIG. 1 is a block diagram illustration of a point of measurement within a digital baseband system.

The concepts of this invention relate generally to wireless digital communication systems and, in particular, to fast and efficient measurement techniques for TD-SCDMA technology. One of the five main subsystems of a TD-SCDMA system is the measurement subsystem. The acquired measurement quantities by the measurement subsystem are utilized by the other subsystems, namely by the Joint Detection (JD), Control Unit (CU), Burst Composition (BC), and Initial Cell Search/Re-Search (ICS/RS) units. FIG. 1 is a block diagram illustration of a point of measurement within a digital baseband system.

The measured quantities are utilized in such computations as cell handover, dynamic channel allocation, system performance, timing between node-B and the user equipment (UE), and for providing control parameters for hardware implementation. Some of the major measured quantities are as follow:
  Peak-Peak Level (Peak-Peak Level of received signals);
  RSCP (Received Signal Code Power);
  ISCP (Interference Signal Code Power);
  SNR/ANR (Signal to Noise Ratio and Amplitude to Noise Ratio);
  FOE (Frequency Offset Estimation);
  IRT (Impulse Response Timing);
  SIR (Signal to Interference Ratio);
  SFN-SFN OTD (where SFN is System Frame Number and OTD is Observed Time Difference);
  SFN-CFN OTD (where CFN is Continuous Frame Number);
  BLER (Block Error Rate); and
  TA (Timing Advance).

It seems that the most computation-intensive measurements are ISCP and IRT. The focus of this invention is primarily to reduce the computational complexity of the ISCP measurement.

In a typical TD-SCDMA system, multiple transmitting circuits send multiple messages to each base station, and a JD receiver may be at a base station, at UEs, or at both. Also, a data generator in each transmitter generates the data to be communicated to a receiver, and sends the data over a wireless radio channel. A modulation/spreading/training sequence insertion device spreads the data with the appropriate code(s) and makes the spread reference data time-multiplexed with a midamble training sequence in the appropriate assigned time slot, producing a communication burst or bursts.

Figure 2:
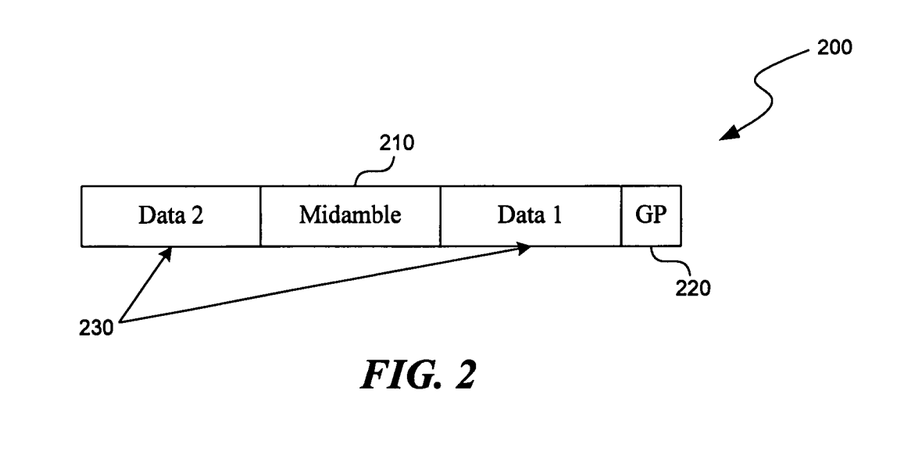
FIG. 2 is a configuration diagram of a typical communication burst.

FIG. 2 is a configuration diagram of a communication burst 200. A typical communication burst has a midamble 210, a guard period 220, and two data fields 230. The midamble 210 separates the two data fields 230 and the guard period 220 separates the communication bursts to allow for the difference in arrival times of the bursts transmitted from different transmitters. The two data fields 230 contain the communication burst's data. The communication burst 200 is modulated by a modulator to radio frequency (RF). An antenna radiates the RF signal through the wireless radio channel to an antenna of the receiver. The type of modulation used for the transmitted communication can be any of those known to those skilled in the art, such as quadrature phase shift keying (QPSK) or M-ary quadrature amplitude modulation (QAM).

The antenna of the receiver receives various radio frequency signals. The received signals are demodulated by a demodulator to produce a baseband signal. The baseband signal is sampled by a sampling device, such as one or multiple analog to digital converters, at the chip rate or a multiple of the chip rate of the transmitted bursts. The sampled data is subsequently processed, for example, by a channel estimation device and a fast JD device, with the appropriate codes assigned to the received bursts. The channel estimation device uses the midamble training sequence component in the baseband samples to compute channel information, such as channel impulse responses. The JD device uses the channel information provided by the channel estimation device and the known spreading codes used by the transmitter to estimate the data content of the desired received communication burst(s). Channel estimation is a vital part of a JD process. The output of the channel estimator is also utilized in ISCP computations.

Figure 3:
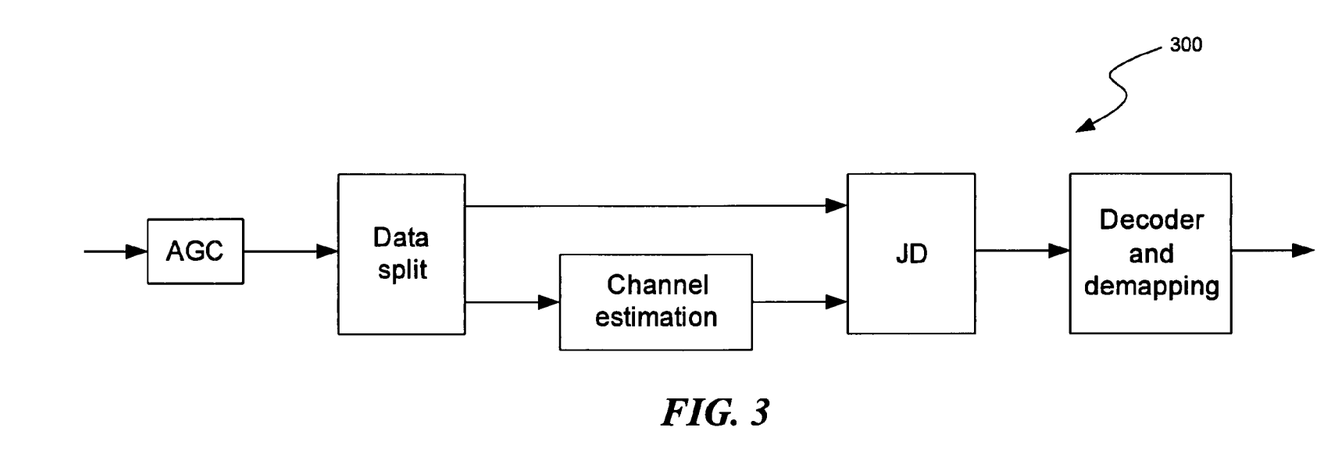
FIG. 3 is a high-level block diagram of a TD-SCDMA user equipment digital baseband configuration.
Figure 4:
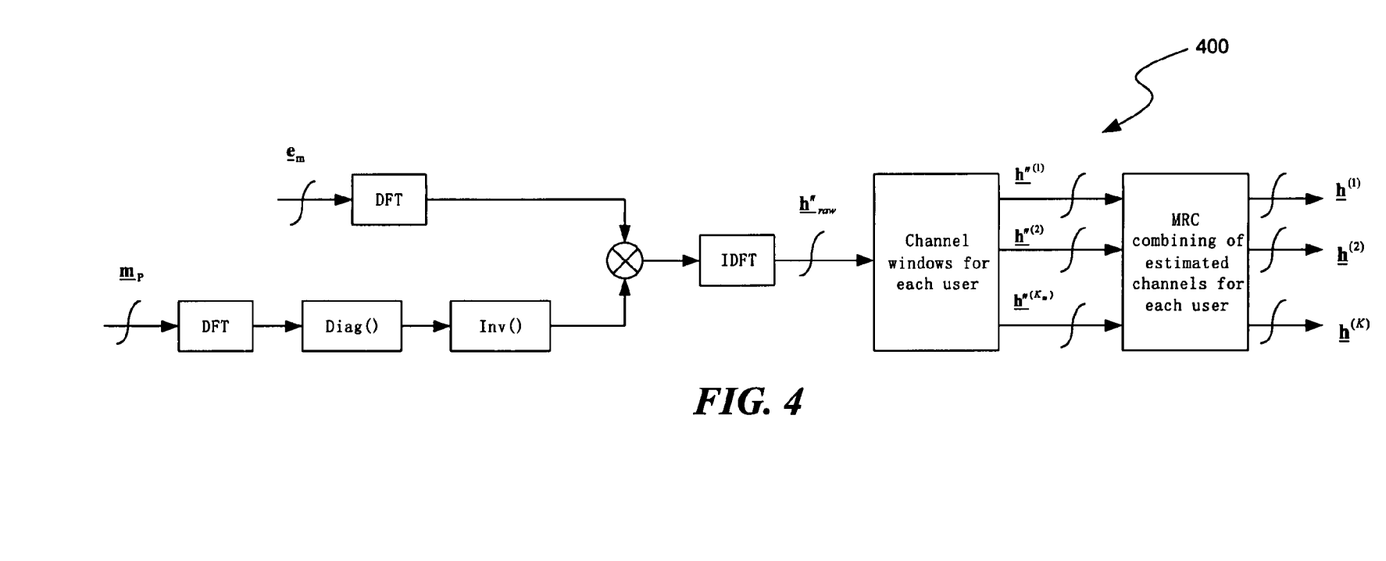
FIG. 4 is a detailed block diagram of the digital baseband configuration of FIG. 3.

"Joint Detection" is a key technology in a TD-SCDMA system, which can increase the communication capacity by depressing the interference from other users. An advantage of the Joint Detection algorithms over other detection methods is that the Joint Detection algorithms process the signals from all the users in parallel and include the interference information from all the users. FIG. 3 is a high-level block diagram of a TD-SCDMA user equipment digital baseband configuration 300. FIG. 4 is a detailed block diagram of the digital baseband configuration of FIG. 3. Overcoming interference from other users through JD enables node-B to handle a much larger number of users and to manage and process their signals.

The terminology used in the description presented here is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this "Detailed Description" section.

Figure 5:
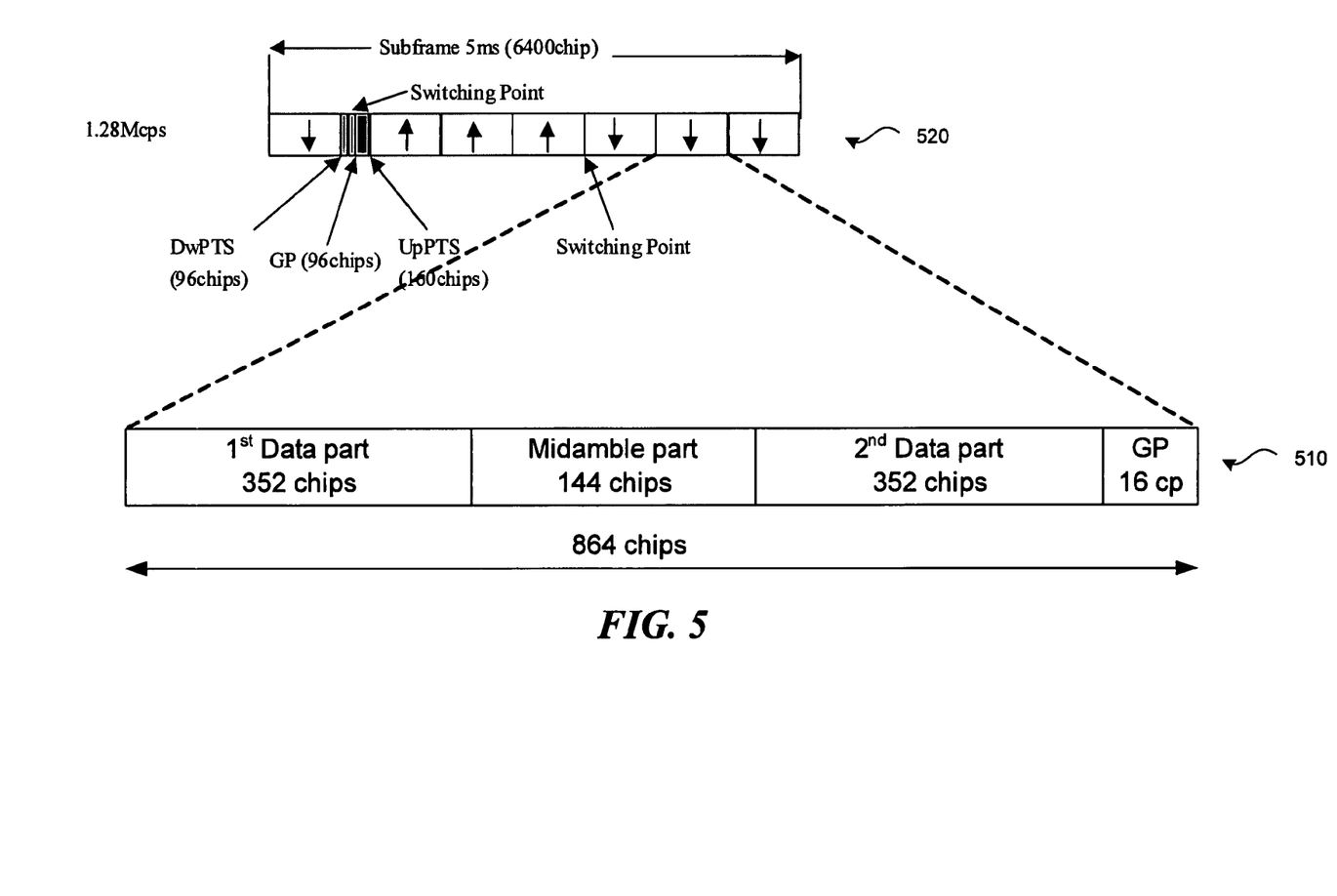
FIG. 5 is a configuration diagram of a typical time slot within a subframe.

Reference throughout the specification to "one embodiment" or "an embodiment" means that a particular feature, structure, implementation, or characteristic described in connection with the embodiment is included in at least one embodiment of the present invention. Thus, the phrases "in one embodiment" and "in an embodiment" in various places throughout the specification do not necessarily all refer to the same embodiment. Furthermore, the particular features, structures, implementations, or characteristics may be combined in any suitable manner in one or more embodiments. In time division duplexing (TDD), data is transmitted as symbols in data packets of predetermined duration or a "time slot." Each data packet includes a predetermined training sequence or midamble within the time slot. The midamble code included in the transmitted packet, which is also known to the receiver, along with the received distorted version, is used for channel estimation and ultimately for correction and compensation of the information symbols in the same data packet. FIG. 5 is a configuration diagram of a typical time slot 510 within a subframe 520. In a TD-SCDMA system, a "Basic Midamble Code" (midamble) is assigned to each node-B. When the system is in the default mode, the midamble is shifted to different phases for different users in that node.

Figure 6:
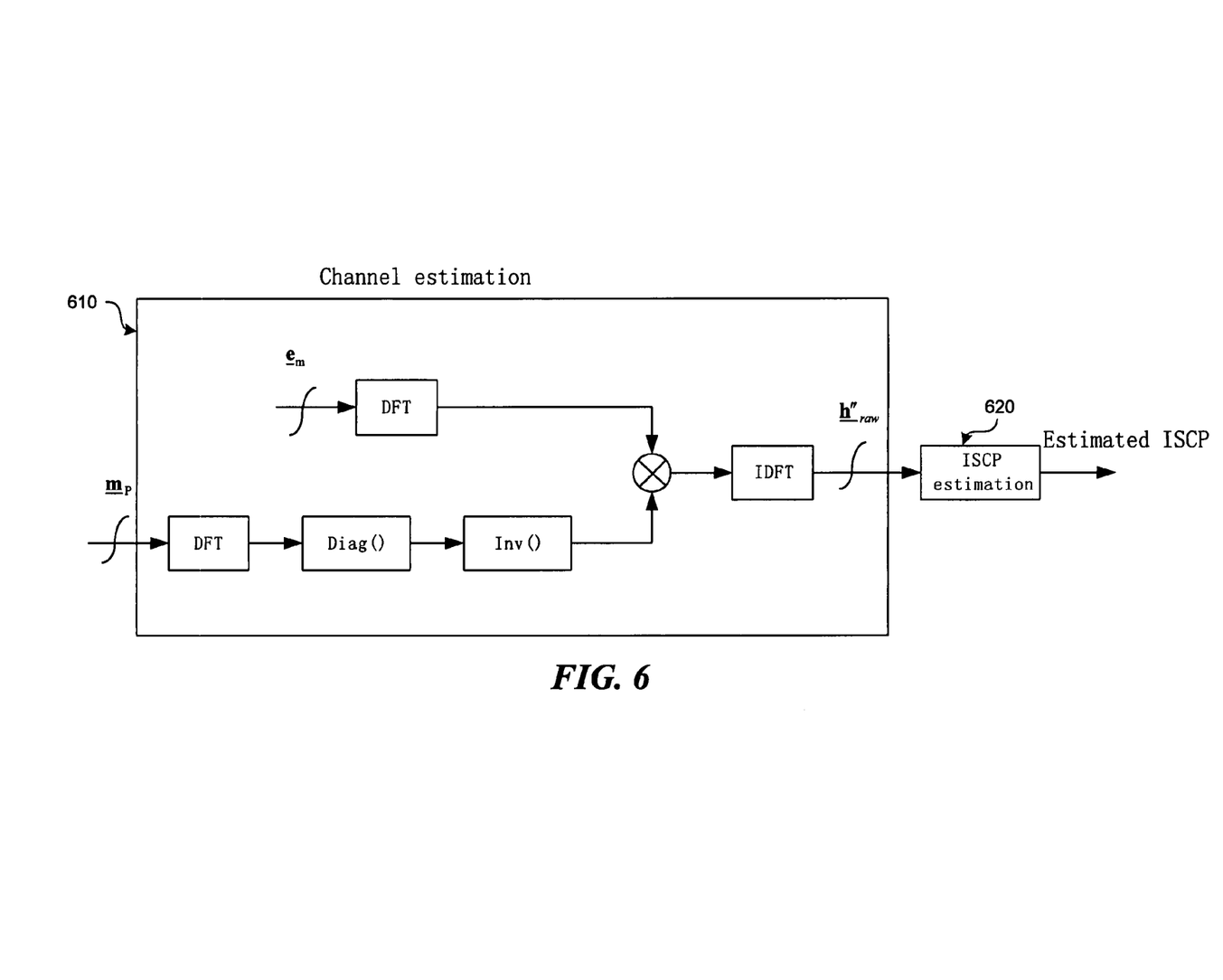
FIG. 6 is a block diagram depicting a relationship between a channel estimation and a ISCP measurement.

FIG. 6 is a block diagram that depicts the relationship between a channel estimation 610 and an ISCP measurement 620, where DFT is the discrete Fourier transform, IDFT is the inverse discrete Fourier transform, $\underline{e}_m$ denotes received signals at the place of midamble, and $\underline{m}_p$ denotes the predetermined midamble code in QPSK modulation, which acts as a training sequence for channel estimation.

Specifically, the ISCP measurements are used in the following procedures of the TD-SCDMA system:

Channel Post-Process, including Noise-Depression and Channel Windows Activation detection;

MMSE—JD algorithm (minimum mean squared error—joint detection); and

Radio Resource Control including Access Control (AC), Dynamic Channel Allocation (DCA), and Radio Resource Management (RRM).

As illustrated by the following algorithms, ISCP can be computed using the channel response, which is obtained from the channel estimation. The main idea in ISCP measurement is to find the weak taps of the estimated channel response, which are the products of the system noise and interference. A "tap" is a coefficient/delay pair in an FIR (finite impulse response) filter. The number of FIR taps is an indication of (1) the amount of memory required to implement the filter, (2) the number of calculations required, and (3) the amount of "filtering" the filter can do; in effect, more taps mean more stopband attenuation, less ripple, narrower filters, etc.

The original algorithm for computing the ISCP is described below. In the first step of the original algorithm, the elements of $\underline{h}''$, which is the original estimated channel response vector, are sorted in an ascending order according to their power. The result of this sorting process is another vector called $\underline{h}'''$. This process is captured in the following equation:

$$\underline{h}''' = \text{sort}(h'') = (h_1''' \, h_2''' \ldots h_{127}''' \, h_{128}''') \quad \text{Equation 1}$$

where $$|h_1'''|^2 \leq |h_2'''|^2 \leq \ldots \leq |h_{127}'''|^2 \leq |h_{128}'''|^2 \quad \text{Equation 2}$$

As mentioned above, a set $\underline{N}_0$, which is composed of the smallest $\underline{h}'''$s, represents the interference, hence $$\underline{N}_0 = (h_1''' \, h_2''' \ldots h_{L_{n0}-1}''' \, h_{L_{n0}}''') \quad \text{Equation 3}$$

The coarse power of ISCP, with P=128 and $L_{n0}$ usually chosen as 64, is $$\sigma_{n0}^2 = \frac{P}{D \cdot L_{n0}} N_0 N_0^H \quad \text{Equation 4}$$

where $N_0^H$ is $N_0$ Hermitian and parameter D, which can be pre-computed and stored locally, is defined as:

$$D = \sum_{l=1}^{P} \left| \frac{1}{\sum_{i=1}^{P} m_j e^{-j2\pi l i / P}} \right|^2 = \sum_{l=1}^{P} \left| \frac{1}{fft(m)_l} \right|^2 \quad \text{Equation 5}$$

In the second step of the original algorithm a threshold $\Gamma_{CHE}$ is defined as $$\Gamma_{CHE} = \varepsilon_{CHE} \cdot \frac{(\sigma_{n0}^2 / \beta)}{P} = \frac{\sigma_{n0}^2}{P} \cdot (\varepsilon_{CHE} / \beta), \quad \text{Equation 6}$$

where $\varepsilon_{CHE}$ is the noise threshold in the channel post-process module, and $\beta$ denotes a correction coefficient. Usually $\varepsilon_{CHE}$ and $\beta$ are chosen so that $(\varepsilon_{CHE}/\beta)=9$.

In this step of the original algorithm $\underline{N}_i$ is defined as $$\underline{N}_i = \begin{cases} h_i'', & |h_i''|^2 < \Gamma_{CHE} \\ 0, & \text{others} \end{cases} \quad i = 0 \cdots 127 \quad \text{Equation 7}$$

and $$\sigma_n^2 = \frac{P}{D \cdot L_n} \underline{N} \underline{N}^H \quad \text{Equation 8}$$

where $L_n$ is the number of the non-zero elements of vector N, or the number of $\underline{N}_i \neq 0$.

After calculating $\sigma_n^2$, the ISCP can be computed as follows:

$$P_{ISCP\_dBm} = 10 \log_{10}(\sigma_n^2) + A_{calibrate} - AGC\_\text{factor} \quad \text{Equation 9}$$

where AGC_factor is acquired from CU.

$$ISCP\_LEV = \begin{cases} 0, & P_{ISCP\_dBm} < -115 \\ P_{ISCP\_dBm} + 116, & -115 \leq P_{ISCP\_dBm} < -25 \\ 91, & -25 \leq P_{ISCP\_dBm} \end{cases} \quad \text{Equation 10}$$

$$\bar{P}_{ISCP\_dBm} = 10\log_{10}(\bar{\sigma}_n^2) + A_{calibrate} - AGC\_\text{factor} \quad \text{Equation 11}$$

Assuming $L_{n0}$=64, $L_n$=64, the computational complexity of the ISCP comprises:

number of multiplications=(2×128)+(1)=257 number of additions=($2L_{n0}$−1)+($2L_n$−1)=254 number of comparisons=[128 $\log_2$(128)]+ [$\log_2$(128)+1]=904

Note that $$\frac{P}{D \cdot L_{n0}}$$

in Equation 4, D in Equation 5, and $$\frac{\varepsilon_{CHE}/\beta}{P}$$

in Equation 6 can be pre-computed and stored in a local memory.

Figure 7:
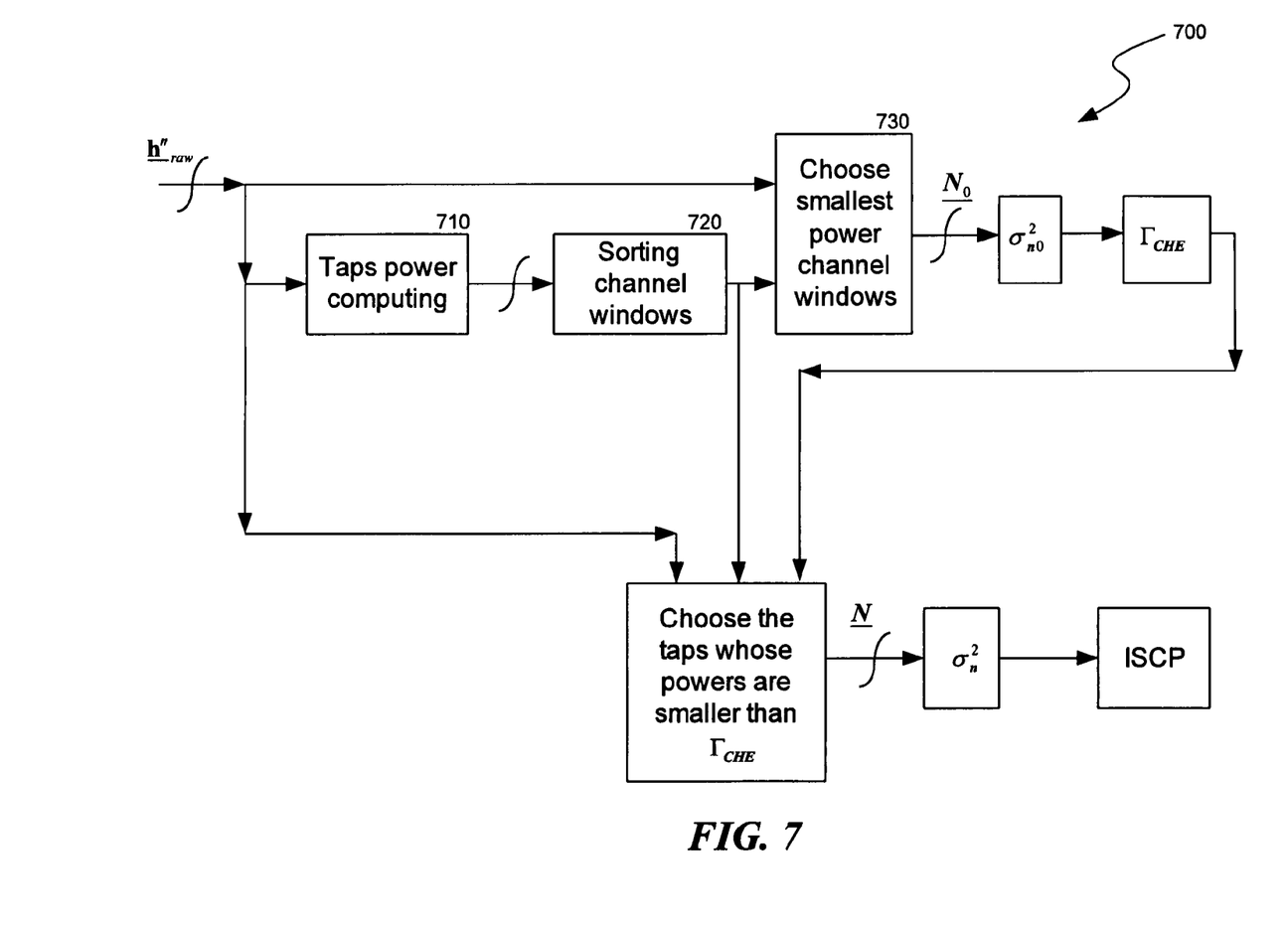
FIG. 7 is a block diagram illustrating some of the ISCP measurement processes, in accordance with an embodiment of the present invention.

As an example of the effectiveness of the proposed method, an embodiment is selected with a periodic midamble sequence with K=8 channel windows and a window length of P/K=16, which is the most common case in the TD-SCDMA system. FIG. 7 is a block diagram of the ISCP measurement subsystem 700, depicting the present embodiment of the invention. In the "common mode," only one of the 8 windows is activated, which has the largest power. The 8 channel windows are presented as:

$$\underline{h}_w^i = [h_{w,1}^i \ h_{w,2}^i \ldots h_{w,16}^i], i=1, 2, \ldots, 8 \quad \text{Equation 12}$$

where the power of each channel window is computed at point 710 as $$P_w^i = \|\underline{h}_w^i\|^2 \quad \text{Equation 13}$$

At point 720 of the process, $P_w^i$'s are reordered in an ascending order such that $$P_w^1 \leq P_w^2 \leq \ldots \leq P_w^8, \text{ where } \underline{h}_w^i, i=1, 2, \ldots, 8 \quad \text{Equation 14}$$

As a result of the reordering, $\underline{h}_w^8$ is the activated channel window with the largest power.

In the first step of this embodiment of the proposed method, the noise vector $\underline{N}_0$ is defined, at point 730, as:

$$\underline{N}_0 = (\underline{h}_w^1 \ \underline{h}_w^2 \ \underline{h}_w^3 \ \underline{h}_w^4) \quad \text{Equation 15}$$

Figure 8:
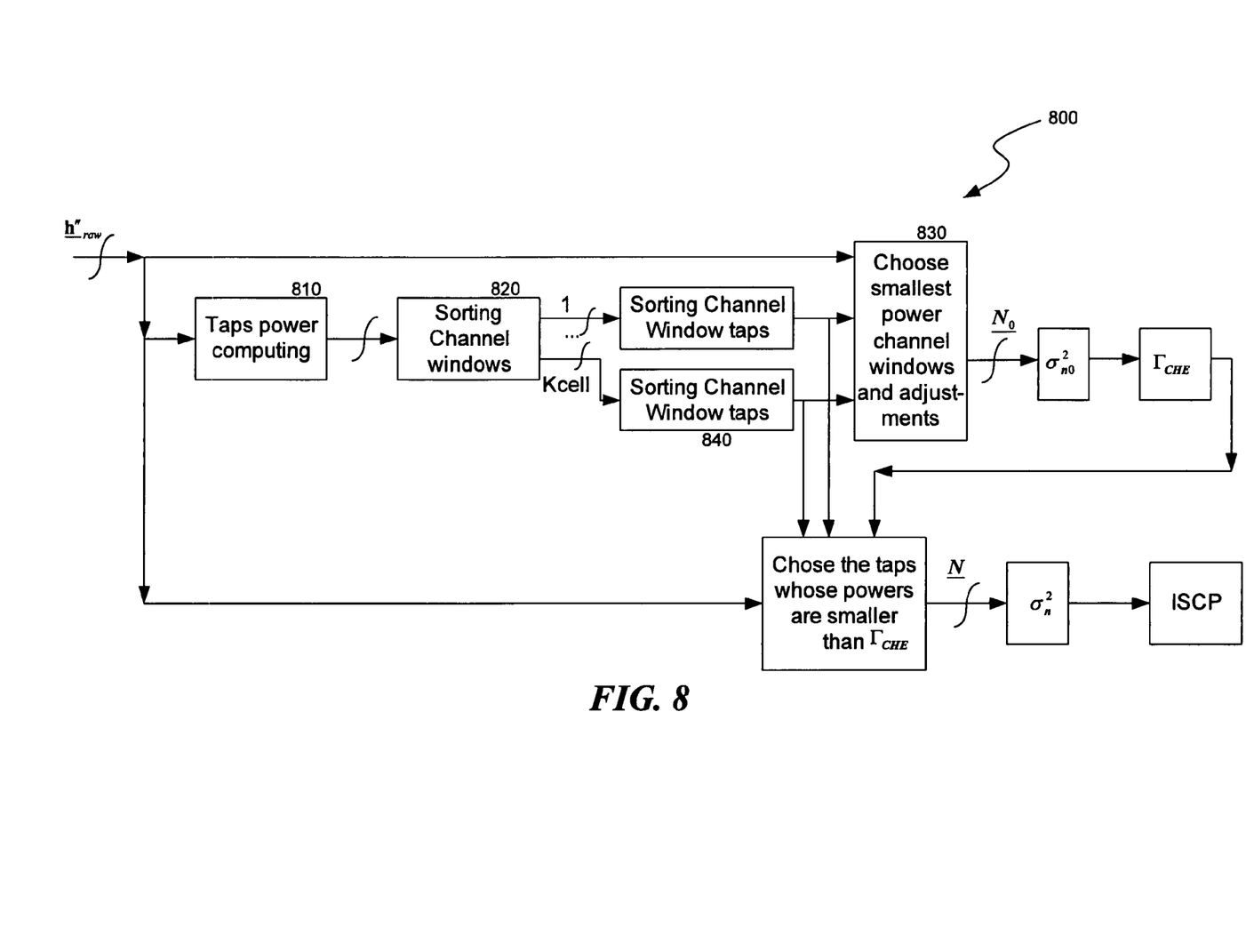
FIG. 8 is a block diagram illustrating some of the ISCP measurement processes, in accordance with another embodiment of the present invention.

While the rest of the proposed method can be the same as Equation 4 through Equation 11 of the original algorithm, the computational complexity has been reduced, as illustrated below:

number of multiplications=(2×128)+(1)=257 number of additions=$(2L_{n0}-1)+(2L_n-1)=254$ number of comparisons=$[8 \log_2(8)]=24$ FIG. 8 is a block diagram of the ISCP measurement subsystem 800, depicting another embodiment of the present invention. In this embodiment, concerning the "default mode," the 8 channel windows can still be presented as:

$$\underline{h}_w^i = [h_{w,1}^i \ h_{w,2}^i \ldots h_{w,16}^i], i=1, 2, \ldots, 8 \quad \text{Equation 16}$$

where the power of each channel window is computed at point 810 as $$P_w^i = \|\underline{h}_w^i\|^2 \quad \text{Equation 17}$$

At point 820 of the process, $P_w^i$'s are reordered in an ascending order such that $$P_w^1 \leq P_w^2 \leq \ldots \leq P_w^8, \text{ where } \underline{h}_w^i, i=1, 2, \ldots, 8 \quad \text{Equation 18}$$

Assuming that $K_d$ windows of the 8 channel windows are activated, in the first step of this embodiment the noise vector $\underline{N}_0$ is defined, at point 830, as:

$$\underline{N}_0 = (\underline{h}_w^1 \ \underline{h}_w^2 \ldots \underline{h}_w^{8-K_d}) \quad \text{Equation 19}$$

However, utilizing the outputs at point 840, if $K_d > 4$, the length of $\underline{N}_0$ is less than 64, and as many as $$\left\lceil \frac{64 - \text{length}(\underline{N}_0)}{K_d} \right\rceil$$

smallest taps of $\underline{h}_w^i$, $i=8-K_d+1, \ldots, 8$ will be added to $\underline{N}_0$, and if $K_d \leq 4$, then $\underline{N}_0$ is updated to $\underline{N}_0 = (\underline{h}_w^1 \ \underline{h}_w^2 \ \underline{h}_w^3 \ \underline{h}_w^4)$.

In this embodiment, while the rest of the proposed method can be the same as Equation 4 through Equation 11 of the original algorithm, the computational complexity has been reduced as illustrated below (assuming $L_{n0}=64$, $L_n=64$):

number of multiplications=(2×128)+(1)=257 number of additions=$(2L_{n0}-1)+(2L_n-1)=254$ $[8 \log_2(8)] \leq$ number of comparisons $\leq [8 \times 16 \log_2(16)]$
or 24 $\leq$ number of comparisons $\leq$ 512

Note that the upper limit of the number of comparisons is the result of all the windows being activated.

Simulation has been performed for all three above scenarios, assuming SNR=6 dB and SIR=4 dB while the channel is in multipath fading. The ISCPs obtained from the simulation of the proposed algorithm are found to be the same as the ISCP produced from simulating the original algorithm. However, concerning the computational complexity, while the multiplications and additions can be ignored, the number of comparisons required for the sorting process is drastically decreased (from 904 to 24 for the common mode and to at least 24 and at most 512 for the default mode). In other words, there is a 3667% improvement in the case of common mode and a 77% to 3667% improvement in the case of default mode measurements.

Figure 9:
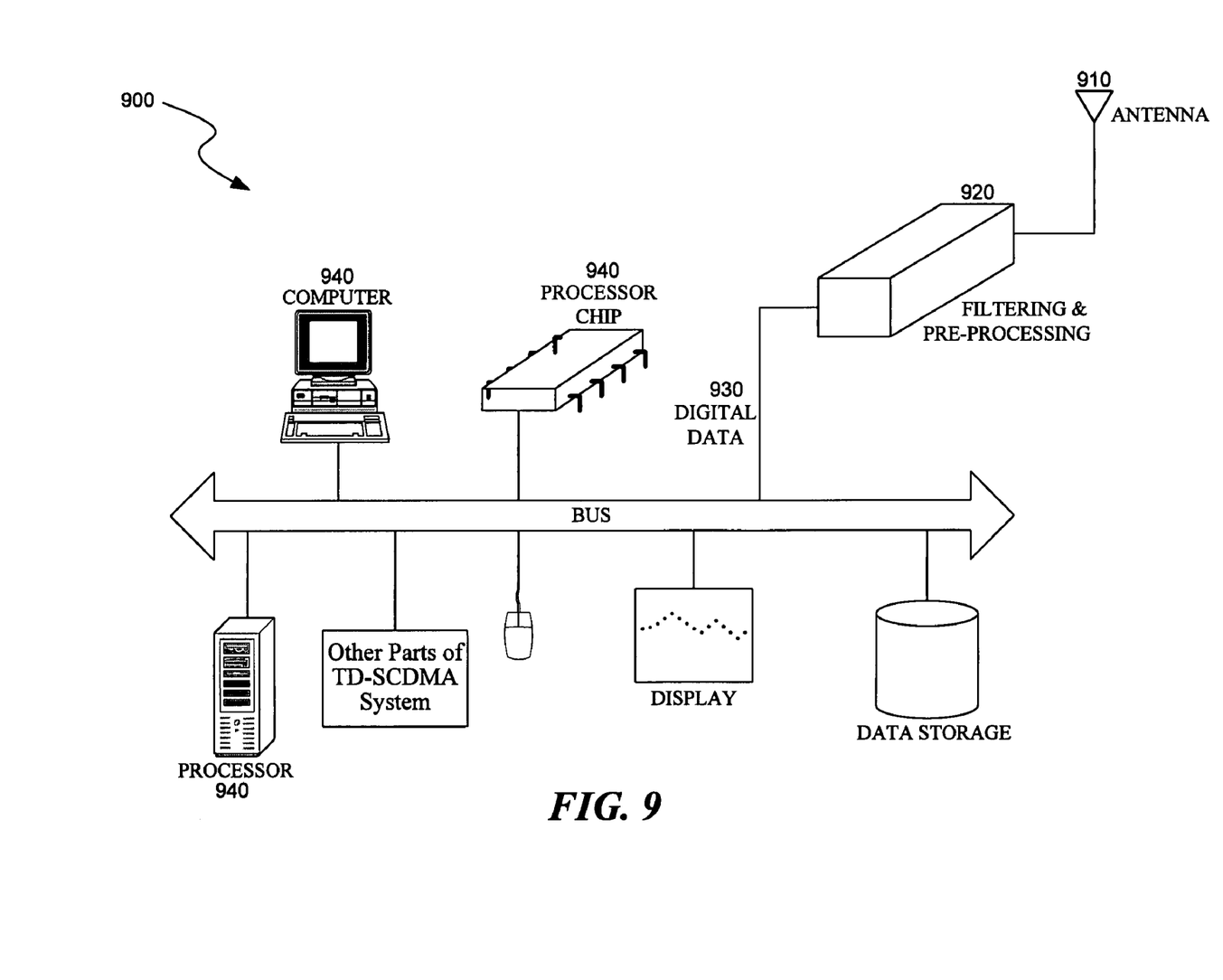
FIG. 9 is a schematic diagram of an ISCP measurement environment, in accordance with an embodiment of the present invention.

FIG. 9 is a schematic diagram of an ISCP measurement environment 900, in accordance with an embodiment of the present invention. In such an environment the transmitted radio signal is received by an antenna 910 and passed to a filtering and pre-processing facility 920, which converts the received analog signal into digitized information 930 and makes it available for further signal processing. Once the transmitted radio signal is in digital form, further processing of the signal will simply be in the form of mathematical manipulation of the digital data by any number of processors 940. The mathematical manipulation of the signals, as presented in the above computations, may require additional quantities from various parts of the TD-SCDMA system. Note that after aquiring $\sigma_n^2$, a low pass filter should be used for smoothness.

$$\bar{\sigma}_n^2(n) = (1-p)\bar{\sigma}_n^2(n-1) + p\sigma_n^2(n); \quad \bar{\sigma}_n^2(0) = \sigma_n^2(0), \quad p = \frac{1}{60}.$$

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the "Detailed Description" section using the singular or plural number may also include the plural or singular number, respectively. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily to the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless this "Detailed Description" section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A method of Interference Signal Code Power (ISCP) measurement, in a Time-Division, Synchronous Code-Division Multiple Access (TD-SCDMA) communication system utilizing channel estimation processes, wherein a plurality of coded signals are transmitted from individual remote units that are distinguished by specific encodings, and wherein the specific encodings comprises a midamble divided into a plurality of channel windows having a plurality of channel windows responses, the method comprising:

extracting the midamble;

estimating the channel window responses based at least in part on the midamble;

forming channel window response vectors based at leat in part on the channel window responses;

calculating powers of the channel windows using the channel window response vectors;

comparing and sorting the powers of the channel windows;

forming a low-power vector utilizing a number of the channel window response vectors with the lowest powers; and utilizing the low-power vector in the computations of the ISCP.

2. The method of claim 1, wherein the number of the channel window response vectors employed to form the low-power vector is half of the total number of the channel windows.

3. The method of claim 1, wherein the midamble is periodic.

4. The method of claim 1, wherein the midamble is periodic and each channel window is as long as one complete midamble period.

5. The method of claim 1, wherein the TD-SCDMA system operates in common mode.

6. A method of Interference Signal Code Power (ISCP) measurement, in a Time-Division, Synchronous Code-Division Multiple Access (TD-SCDMA) communication system utilizing channel estimation processes, wherein a plurality of coded signals are transmitted from individual remote units that are distinguished by specific encodings, and wherein the specific encodings comprises a midamble that forms C channel windows each with a window length of F, the channel windows having a plurality of channel windows reponses, the method comprising:

extracting the midamble;

estimating the channel window responses based at least in part on the midamble;

forming C channel window response vectors $\underline{h}_w^i = [h_{w,1}^i\ h_{w,2}^i \ldots h_{w,16}^i]$, where $i=1, 2, \ldots, C$;

calculating powers of the channel windows $P_w^i = \|\underline{h}_w^i\|^2$, where $i=1, 2, \ldots, C$;

comparing and sorting the powers of the channel windows $P_w^1 \leq P_w^2 \leq \ldots \leq P_w^8$, where $\underline{h}_w^i$, $i=1, 2, \ldots, C$;

forming a low-power vector utilizing a number of the channel window response vectors with the lowest powers, $\underline{N}_0 = (\underline{h}_w^1\ \underline{h}_w^2\ \underline{h}_w^3\ \underline{h}_w^4)$; and utilizing the low-power vector in the computations of the ISCP.

7. The method of claim 6, wherein the number of the channel window response vectors employed to form the low-power vector is C/2.

8. The method of claim 6, wherein the midamble is periodic and is P-long, where F=P/C.

9. The method of claim 6, wherein the midamble is periodic and each channel window is as long as one complete period.

10. The method of claim 6, wherein the TD-SCDMA system operates in common mode.

11. A method of Interference Signal Code Power (ISCP) measurement, in a Time-Division, Synchronous Code-Division Multiple Access (TD-SCDMA) communication system utilizing channel estimation processes, wherein a plurality of coded signals are transmitted from individual remote units that are distinguished by specific encodings, and wherein the specific encodings comprises a midamble that forms C channel windows each with a window length of F, the channel windows having a plurality of channel windows responses, the method comprising:

extracting the midamble;

estimating the channel window responses based at least in part on the midable;

forming C channel window response vectors based on the channel window responses $\underline{h}_w^i = [h_{w,1}^i \ h_{w,2}^i \ldots h_{w,16}^i]$, where $i=1, 2, \ldots, C$;

calculating powers of the channel windows $P_w^i = \|\underline{h}_w^i\|^2$, where $i=1, 2, \ldots, C$;

comparing and sorting the powers of the channel windows $P_w^1 \leq P_w^2 \leq \ldots \leq P_w^8$, where $\underline{h}_w^i$, $i=1, 2, \ldots, C$;

forming a low-power vector utilizing a number of the channel window response vectors with the lowest powers, $\underline{N}_0 = (\underline{h}_w^1 \ \underline{h}_w^2 \ldots \underline{h}_w^{8-K_d})$, where $K_d$ is the number of activated channel windows, and if $K_d > 4$, as many as $$\left\lceil \frac{64 - \text{length}(\underline{N}_0)}{K_d} \right\rceil$$

smallest taps of $\underline{h}_w^i$, $i=8-K_d+1, \ldots, 8$ is added to $\underline{N}_0$, and if $K_d \leq 4$, $\underline{N}_0$ is updated to $\underline{N}_0 = (\underline{h}_w^1 \ \underline{h}_w^2 \ \underline{h}_w^3 \ \underline{h}_w^4)$; and utilizing the low-power vector in the computations of the ISCP.

12. The method of claim 11, wherein the midamble is periodic and is P-long, where F=P/C.

13. The method of claim 11, wherein the midamble is periodic and each channel window is as long as one complete period.

14. The method of claim 11, wherein the TD-SCDMA system operates in default mode.

15. An apparatus for an Interference Signal Code Power (ISCP) measurement, in a Time-Division, Synchronous Code-Division Multiple Access (TD-SCDMA) communication system utilizing channel estimation processes, wherein a plurality of coded signals are transmitted from individual remote units that are distinguished by specific encodings, and wherein the specific encodings comprises a midamble that forms C channel windows each with a window length of F, the channel windows having a plurality of channel windows responses, the apparatus comprising:

means for extracting the midamble;

means for estimating the channel window responses based at least in part on the midamble;

means for forming C channel window response vectors based on the channel window responses $\underline{h}_w^i = [h_{w,1}^i \ h_{w,2}^i \ldots h_{w,16}^i]$, where $i=1, 2, \ldots, C$;

means for calculating powers of the channel windows $P_w^i = \|\underline{h}_w^i\|^2$, where $i=1, 2, \ldots, C$;

means for comparing and sorting the powers of the channel windows $P_w^1 \leq P_w^2 \leq \ldots \leq P_w^8$, where $\underline{h}_w^i$, $i=1, 2, \ldots, C$;

means for forming a low-power vector utilizing a number of the channel window response vectors with the lowest powers, $\underline{N}_0 = (\underline{h}_w^1 \ \underline{h}_w^2 \ldots \underline{h}_w^{8-K_d})$, where $K_d$ is the number of activated channel windows, and if $K_d > 4$, as many as $$\left\lceil \frac{64 - \text{length}(\underline{N}_0)}{K_d} \right\rceil$$

smallest taps of $\underline{h}_w^i$, $i=8-K_d+1, \ldots, 8$ is added to $\underline{N}_0$, and if $K_d \leq 4$, $\underline{N}_0$ is updated to $\underline{N}_0 = (\underline{h}_w^1 \ \underline{h}_w^2 \ \underline{h}_w^3 \ \underline{h}_w^4)$; and means for utilizing the low-power vector in the computations of the ISCP.

16. The apparatus of claim 15, wherein the midamble is periodic and is P-long, where F=P/C.

17. The apparatus of claim 15, wherein the midamble is periodic and each channel window is as long as one complete period.

18. An Interference Signal Code Power (ISCP) measurement method in a Time-Division, Synchronous Code-Division Multiple Access (TD-SCDMA) communication system utilizing channel estimation processes, wherein a plurality of coded signals are transmitted from individual remote units that are distinguished by specific encodings, and wherein the specific encodings comprises a midamble divided into a plurality of channel windows having a plurality of channel windows responses, the method comprising the steps of:

extracting the midamble;

estimating the channel window responses based at least in part on the midamble;

forming channel window response vectors based on the channel window respones;

calculating powers of the channel windows using the channel window response vectors;

comparing and sorting the powers of the channel windows;

forming a low-power vector, utilizing a number of the channel window response vectors with the lowest powers; and utilizing the low-power vector in the computations of the ISCP.

19. An Interference Signal Code Power (ISCP) measurement process in a Time-Division, Synchronous Code-Division Multiple Access (TD-SCDMA) communication system utilizing channel estimation processes, wherein a plurality of coded signals are transmitted from individual remote units that are distinguished by specific encodings, and wherein the specific encodings comprises a midamble that forms C channel windows each with a window length of F, the channel windows having a plurality of channel windows reponses, the process comprising the steps of:

extracting the midamble;

estimating the channel window responses based at least in part on the midamble;

forming C channel window response vectors based on the channel window responses $\underline{h}_w^i = [h_{w,1}^i\ h_{w,2}^i \ldots h_{w,16}^i]$, where $i=1, 2, \ldots, C$;

calculating powers of the channel windows $P_w^i = \|\underline{h}_w^i\|^2$, where $i=1, 2, \ldots, C$;

comparing and sorting the powers of the channel windows $P_w^1 \leq P_w^2 \leq \ldots \leq P_w^8$, where $\underline{\tilde{h}}_w^i$, $i=1, 2, \ldots, C$;

forming a low-power vector utilizing a number of the channel window response vectors with the lowest powers, $\underline{N}_0 = (\underline{\tilde{h}}_w^1\ \underline{\tilde{h}}_w^2 \ldots \underline{\tilde{h}}_w^{8-K_d})$, where $K_d$ is the number of activated channel windows, and if $K_d > 4$, as many as $$\left\lceil \frac{64 - \text{length}(\underline{N}_0)}{K_d} \right\rceil$$

smallest taps of $\underline{\tilde{h}}_w^i$, $i = 8 - K_d + 1, \ldots, 8$ is added to $\underline{N}_0$, and if $K_d \leq 4$, $\underline{N}_0$ is updated to $\underline{N}_0 = (\underline{\tilde{h}}_w^1\ \underline{\tilde{h}}_w^2\ \underline{\tilde{h}}_w^3\ \underline{\tilde{h}}_w^4)$; and utilizing the low-power vector in the computations of the ISCP.

* * * * *